April 27, 1926.
W. B. LOUTHAN
PIN CUTTING AND SEPARATING MACHINE
Filed Jan. 7, 1926
1,582,768
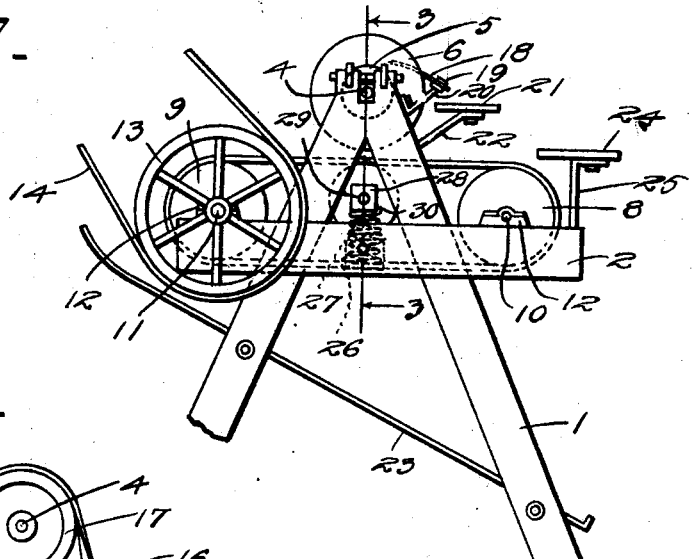
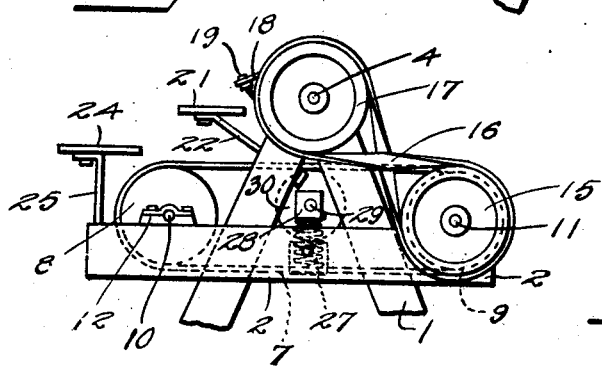
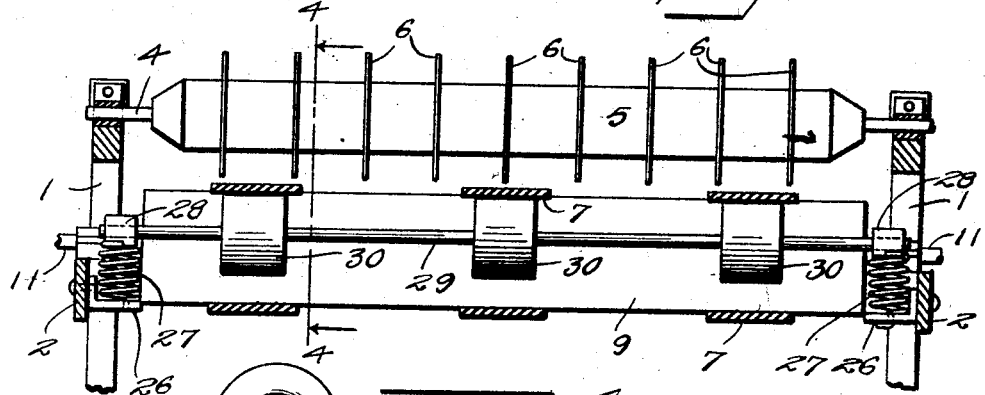
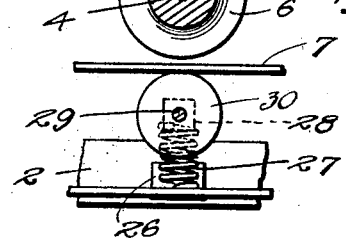
Inventor
W. B. Louthan.
By Watson E. Coleman
Attorney Patented Apr. 27, 1926.

1,582,768

UNITED STATES PATENT OFFICE.

WILLIAM B. LOUTHAN, OF EAST LIVERPOOL, OHIO.

PIN CUTTING AND SEPARATING MACHINE.

Application filed January 7, 1926. Serial No. 79,889.

*To all whom it may concern:*

Be it known that I, WILLIAM B. LOUTHAN, a citizen of the United States, residing at East Liverpool, in the county of Columbiana and State of Ohio, have invented certain new and useful Improvements in Pin Cutting and Separating Machines, of which the following is a specification, reference being had to the accompanying drawings.

This invention relates to pin cutting and separating machines and more particularly to a machine of this character employed for cutting and separating porcelain pins used by potters for spacing apart glazed pottery ware during the process of firing.

An important object of the invention is to improve the structure disclosed in my prior Patent, No. 928,206, patented July 13, 1909, for pin cutting and separating machines, to provide therein a structure whereby proper supporting of the pins is insured.

As set forth in this prior patent, a structure is provided whereby the pins which are produced from elongated strands of clay are separated by passing them upon a belt beneath cutters whereby they are at once separated and removed from the support upon which they are arranged for delivery to a platform from which they may be removed for use. In this structure, the delivery of the pins to the platform is accomplished by the disk knives employed for cutting the same, the clay adhering to the knives after it has been cut. It will be obvious that if the cutting is not complete, the tendency of the pins to adhere to the board or other implement upon which they are being fed to the machine is increased and furthermore if they do not adhere and are only partially separated, they are damaged in the separation resulting from their removal from the knife blades. Accordingly, an important object of this invention is the production of a structure wherein the pins are properly severed and separated from one another.

These and other objects I attain by the construction shown in the accompanying drawing, wherein for the purpose of illustration is shown a preferred embodiment of my invention and wherein:—

Figure 1 is an elevation of one side of a machine constructed in accordance with my invention;

Figure 2 is a similar view of the opposite side thereof;

Figure 3 is an enlarged sectional view taken on the line 3—3 of Figure 1;

Figure 4 is a section on the line 4—4 of Figure 3.

In the drawings, 1 denotes a supporting frame which may be of any suitable form and construction but which preferably comprises two connected end pieces of inverted V-shape provided with horizontal beams 2.

Mounted in suitable bearings 3 at the top of the V-shaped end pieces or members is the shaft 4 of a knife drum 5. The latter is cylindrical and has suitably fixed to it a plurality of circular or disk-like rotary cutters or knives 6 which are suitably spaced apart according to the length of the pins to be cut by the machine.

Arranged upon the frame beneath the knives is an endless carrier adapted to receive the pin boards and to carry them through the machine and beneath the knives so that the latter will cut the plastic strips upon such boards. Said carrier preferably consists of two or more belts 7 passed around horizontally disposed drums or rollers 8, 9 fixed upon shafts 10, 11 journaled in suitable bearings 12 upon the horizontal beams 2 of the end pieces. The drum 8 is arranged at the front end of the frame and the drum 9 at its rear end; and upon one end of the shaft 11 of the rear drum is a pulley 13 to receive a driving belt 14. On the other end of the shaft 11 is a pulley 15 which is connected by a crossed belt 16 to a pulley 17 on one end of the knife shaft 4. By making the pulleys 15, 17 of the same size and employing the crossed belt, it will be seen that the knives will be driven at the same speed as the carrier and that as they sever the plastic material, the latter will adhere to them and be carried upwardly and forwardly.

For the purpose of removing from the knives the pins or pieces of plastic material cut by them, I provide a plurality of deflecting plates or scrapers 18 one of which projects between each two adjacent knives. As illustrated, said scrapers are inclined upwardly and rearwardly and have their rear free ends projecting between the knives while their front and lower ends are suitably secured to a cross bar 19 supported at its ends by brackets 20 from the end pieces of the frame. The scrapers or deflectors 18 are so disposed that pins carried upwardly and forwardly between the knives 6 will be engaged and loosened by them and will drop upon a pin board or upon any other suitable catching plate or receptacle placed upon a rack 21. While the latter may be a support of any description, it preferably comprises a horizontally disposed board arranged above the carrier and in advance of and beneath the deflectors or scrapers 18 and supported by brackets 22 projecting from the end pieces of the frame.

The pin boards passing through the machine drop upon the elevated rear portion of a downwardly and forwardly inclined chute 23 which conveys them by gravity to the front of the machine. This chute 23 is secured between the end pieces or members of the frame and may be of any suitable form and construction.

24 denotes a rack or support similar to the rack 21 and consisting of a board mounted on brackets 25 secured to the forward ends of the horizontal beams 2 so that said board is disposed at the extreme front of the machine and in advance of the working stretch of the endless carrier. Said rack or support 24 is adapted to support the pin boards before they are placed upon the carrier and passed through the machine, so that the operator may remove any imperfect strands upon the boards. The structure above described constitutes the invention disclosed in the prior patent above referred to.

It will be obvious that in a structure of this character, there is a certain tendency of the belt 7 to sag with the result that the boards are permitted to move downwardly to such an extent at times that proper separation of the pins by the knives 6 is not obtained. This is particularly apt to occur in a machine of this type due to the fact that the materials handled are moist and have a tendency when they come in contact with the belts to moisten the same, causing the same to stretch. I accordingly mount upon the frame members 2 seats 26 vertically aligning with the shaft 4 of the knife drum. Upon these seats, I dispose springs 27, the upper ends of which support bearings 28 in which is rotatably mounted a shaft 29. This shaft has rollers 30 secured thereto corresponding in number and arrangement to the belts 7 and each engaging the under surface of the upper run of one of the belts. With this structure, even though the belts themselves may stretch, they cannot sag at the vital point or that point lying immediately beneath the cutters. Furthermore, the springs have the tendency to remove from these belts 7 strain which is placed thereon as the boards are passed beneath the cutters with the result that the tendency of the belts 7 to sag is decreased. The springs 27 are, of course, of the set type and of such length that the upper surface of the upper runs of the belt, when passing over the pulleys 30, is spaced below the lower edges of the knives a distance slightly less than the thickness of the board which is employed. The knives are thus prevented from cutting the belts and at the same time the boards are very firmly held against the knives to insure proper cutting of the pin.

The machine in its operation is identical with the exception of the above changes to the machine described in the prior patent above noted.

I claim:—

1. A machine of the character described comprising a frame, a knife shaft, a plurality of rotary disk knives upon the latter, front and rear rollers journaled in the frame, endless belts between said rollers and disposed beneath the knives to provide an endless carrier, deflectors or scrapers projecting between the knives, a support beneath and in front of said deflectors or scrapers, means for rotating the knife shaft and said rollers and means yieldably resisting separation of the endless belts from the knives.

2. A machine of the character described comprising a frame, a knife shaft, a plurality of rotary disk knives upon the latter, front and rear rollers journaled in the frame, endless belts between said rollers and disposed beneath the knives to provide an endless carrier, deflectors or scrapers projecting between the knives, a support beneath and in front of said deflectors or scrapers, means for rotating the knife shaft and said rollers, means yieldably resisting separation of the endless belts from the knives comprising a shaft extending between the runs of said belts and paralleling said rollers, pulleys carried by said shaft corresponding in number and arrangement to the belts and springs resisting movement of the shaft in a direction away from the knives.

3. A machine of the character described comprising a frame, a knife shaft, a plurality of rotary disk knives upon the latter, front and rear rollers journaled in the frame, endless belts between said rollers and disposed beneath the knives to provide an endless carrier, deflectors or scrapers projecting between the knives, a support beneath and in front of said deflectors or scrapers, means for rotating the knife shaft and said rollers, means yieldably resisting separation of the endless belts from the knives comprising a shaft extending between the runs of said belts and paralleling said rollers, pulleys carried by said shaft corresponding in number and arrangement to the belts and springs resisting movement of the shaft in a direction away from the knives, said springs being inoperative to move said shaft toward the knives a distance such that said belts may engage the knives.

In testimony whereof I hereunto affix my signature.

WM. B. LOUTHAN.